United States Patent [19]

Beizermann

[11] Patent Number: 5,393,960
[45] Date of Patent: Feb. 28, 1995

[54] DEVICE FOR THE TRANSPORT AND DISTRIBUTION OF MEAL TRAYS, INCLUDING INTEGRAL MICROWAVE OVEN FOR RE-HEATING THE LATTER

[75] Inventor: Michel Beizermann, Voiron, France

[73] Assignee: Socamel S.A., France

[21] Appl. No.: 133,099

[22] PCT Filed: Aug. 20, 1992

[86] PCT No.: PCT/FR92/00807
§ 371 Date: Oct. 12, 1993
§ 102(e) Date: Oct. 12, 1993

[87] PCT Pub. No.: WO93/03659
PCT Pub. Date: Mar. 4, 1992

[30] Foreign Application Priority Data

Aug. 23, 1991 [FR] France ................... 91 10755

[51] Int. Cl.6 ............................................. H05B 6/80
[52] U.S. Cl. ..................... 219/729; 219/679;
219/725; 219/762; 312/236; 165/42; 165/918;
99/443 R; 99/DIG. 14
[58] Field of Search ............... 219/729, 730, 725, 734,
219/736, 756, 757, 762, 763, 679; 312/236;
165/42, 43, 58, 61, 65, 918; 99/451, 443 R,
DIG. 14

[56] References Cited
U.S. PATENT DOCUMENTS

| 3,199,579 | 8/1965 | Foster et al. | 165/48 |
| 3,854,021 | 12/1974 | Moore et al. | 219/729 |
| 4,005,745 | 2/1977 | Colato et al. | 165/61 |
| 4,052,589 | 10/1977 | Wyatt | 165/42 |
| 4,198,555 | 4/1980 | Bellavoine | 219/10.55 R |
| 5,086,834 | 2/1992 | Grandi | 165/135 |
| 5,245,150 | 9/1993 | Grandi | 219/725 |

FOREIGN PATENT DOCUMENTS 2363309 3/1978 France .
2647660 12/1990 France .

Primary Examiner—Philip H. Leung
Attorney, Agent, or Firm—Pearne, Gordon, McCoy & Granger

[57] ABSTRACT

Device for the transport and distribution of meal trays including built-in microwave oven for reheating the latter. The device consists of an isothermic unequipped trolley for transporting food trays between kitchens and hospital wards, a central equipped unit permanently installed in hospitals, capable of having one or two transport trolleys coupled to it to form mobile distribution units, and one or two microwave ovens built into the central unit, comprising a metallic shield located between the hot and cold areas, which enables meal trays without a shield to be used. For use in the distribution of individual meal trays in establishments such as hospitals.

3 Claims, 2 Drawing Sheets

DEVICE FOR THE TRANSPORT AND DISTRIBUTION OF MEAL TRAYS, INCLUDING INTEGRAL MICROWAVE OVEN FOR RE-HEATING THE LATTER

This invention relates to a device for the transport and distribution of meal trays including integral microwave ovens for re-heating the latter.

It is intended for the distribution of individual meals on trays in institutions and more particularly in hospitals.

In similar devices which have been produced hitherto, the hot dishes are removed from each tray and assembled in order to be heated together in an adhoc device and are then returned to the trays for distribution. This practice means that:, by the time the last tray has been distributed, the hot dish or dishes are already cold.

French patent 8907568, of the same inventor, partially solves these problems. It describes an apparatus for individually re-heating the hot dishes of each tray at the last minute, leaving them on their trays. This apparatus consists of an isothermic trolley equipped with refrigerated compartments for the meal trays and at least one microwave oven comprising a cold zone and a hot zone which is lower than the latter, the meal trays having a specific shape enabling the food which is to be eaten hot to be re-heated in the lower zone without heating the cold dishes provided on the same tray, this result being obtained by a median transverse separation of the tray with a metal screen incorporated to prevent the waves from propagating towards the cold zone of the tray, the central separation of the tray, by virtue of its raised profile, sealing off the lower hot zone of the microwave oven.

This arrangement has two major drawbacks. First of all, the meal trays, owing to the incorporation of their metal screen, are complicated to produce and consequently expensive. Furthermore, the isothermic trolley with all its equipment has proved fragile, heavy and bulky, which is a problem particularly when it is being moved between the kitchen and a hospital ward.

The device according to the present invention eliminates these drawbacks. In fact, it retains all the advantages of the above patent whilst using meal trays of simplified construction which are cheap to produce, and whilst facilitating the movement of these trays.

It consists of a combination of, in the first place, an isothermic mobile trolley without technical equipment, for transporting food trays between kitchens and hospital wards, and secondly a technically equipped unit permanently situated in the hospital wards, to which one or two mobile trolleys can be coupled, thus forming a mobile distribution unit, and finally one or two microwave ovens built into the technical unit, comprising a metal shield located between the hot and cold areas, which enables meal trays without a shield to be used.

In the accompanying drawings, which are provided as a non-limiting example, of one embodiment of the object of the invention:

Figure 1:
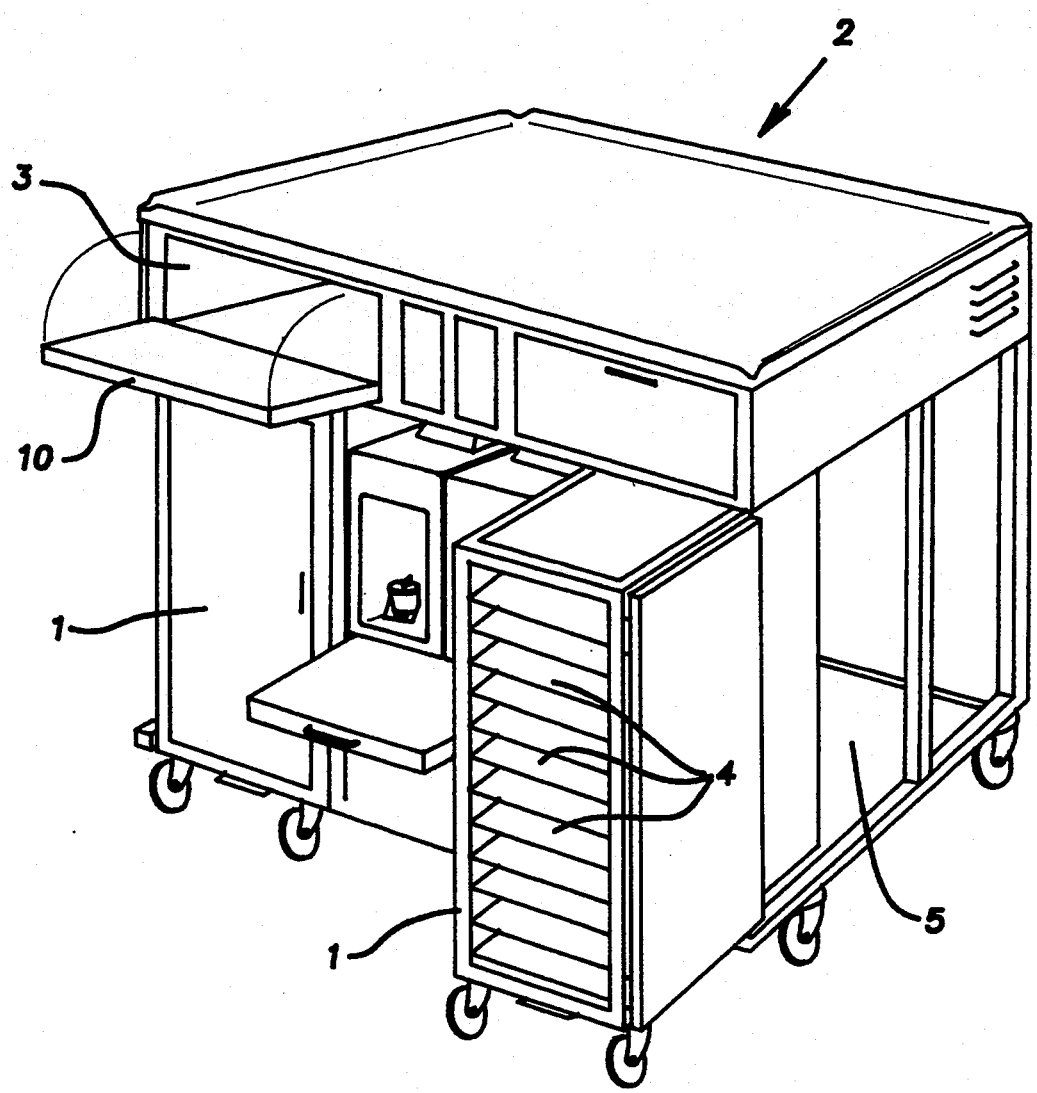
FIG. 1 shows a mobile distribution unit equipped with two mobile trolleys and a microwave oven.
Figure 2:
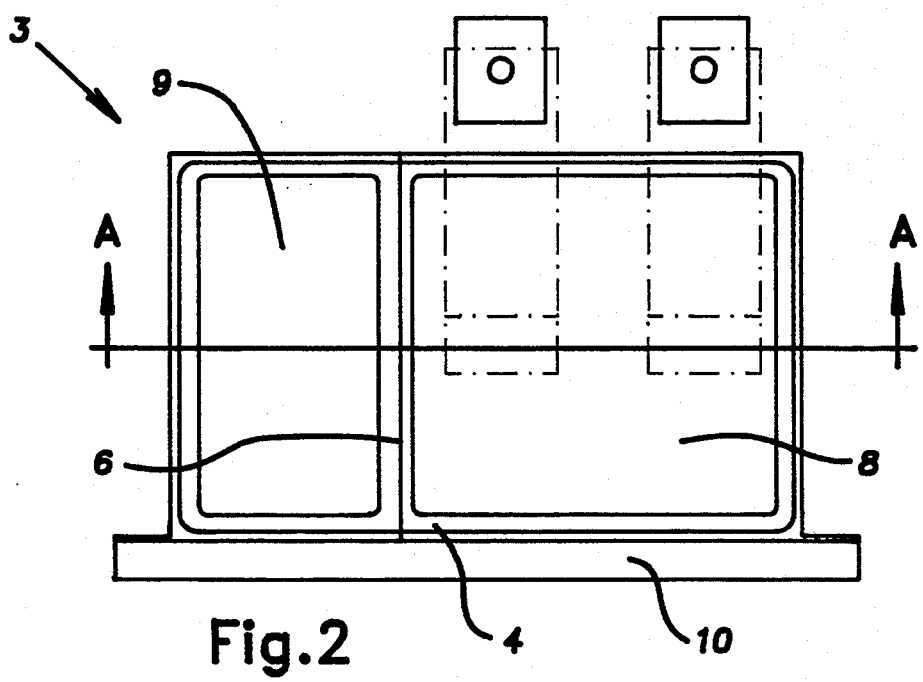
FIGS. 2, 3 and 4 are diagrammatic sections through the microwave oven, more specifically a horizontal section in the direction of the arrows B—B in FIG. 3, a vertical longitudinal section in the direction of the arrows A—A in FIG. 2 and a vertical transverse section in the direction of the arrows C—C in FIG. 3.
Figure 3:
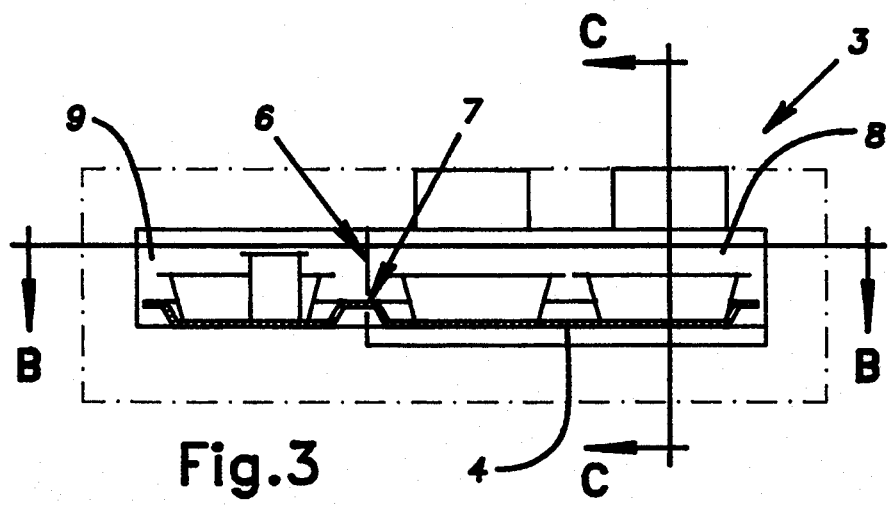
Figure 4:
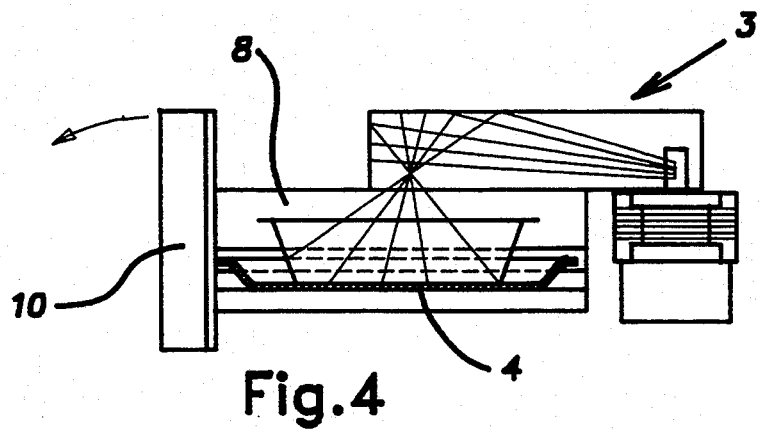

The apparatus shown in FIGS. 1 to 4 consists of one or two isothermic mobile trolleys 1 and a tehnically equipped unit 2 provided with one or two microwave ovens 3.

The mobile trolley 1, which has no technical components which might be prone to break down or sensitive to vibration, shock and rough treatment, carries the food trays 4 back and forth between the kitchens and the hospital wards.

The technically equipped unit 2 is permanently situated in the hospital wards and comprises, in its upper part, one or two microwave ovens 3, the lower part being formed as one or two recesses 5 in which the mobile trolleys 1 can be accommodated and secured in position.

The two types of trolley linked together form a mobile unit for distribution and re-heating of food trays 4.

After the meal the dirty food trays 4 are cleared away and collected using only the very lightweight and easily handled mobile trolley 1, which will take the trays back to the kitchen, to the central washing area. The equipped unit, previously uncoupled, will be put away in the office to await the next meal.

The microwave oven 3 opens in the longitudinal direction and not in the lateral direction as is usually the case. It is divided into two unequal parts, both low level, a hot sector 8 and a cold sector 9, by a screen consisting of a metal partition 6 perpendicular to the door 10 of the entrance of the cavity 3 and provided with a horizontal slot 7 the same thickness as the meal tray 4 and of a length corresponding to the width of said meal tray. The latter, which consequently does not have a metal shield, is inserted in the microwave oven 3 by sliding it into the slot 7, the position of the metal screen being such that the zone of the tray containing the cold food is housed in the cold sector 9, whereas the zone receiving the food to be reheated is positioned in the hot sector 8.

The positioning of the various constituent parts means that the object of the invention has a large number of useful features which had not hitherto been achieved with similar equipment.

I claim:

1. A device for the transport and distribution of food trays intended for the distribution of individual meals comprising the combination of a first isothermic mobile trolley for transporting food trays and a second trolley or unit, to which multiple mobile trolleys can be coupled for movement therewith, thereby forming a mobile distribution unit, and at least one microwave oven installed in an upper part of the second trolley unit having a cavity including a stationary downwardly projecting metal shield arranged to cooperate with a food tray to divide the cavity into a hot sector and a cold sector.

2. A device according to claim 1, wherein the metal shield is perpendicular to a door of the microwave cavity and provided with a horizontal slot having the same width as the food tray, the position of the metal shield being such that the food tray can be inserted in the microwave oven by sliding it into the slot, so that a first area of the food tray containing cold food is accommodated in the cold sector of the microwave oven and a second area of the food tray containing food to be reheated is positioned in the hot sector.

3. A device for the transport and distribution of food trays comprising a first isothermic mobile trolley and a second trolley with a microwave oven, the first mobile trolley being able to be coupled to the second trolley for movement therewith, thereby forming a mobile distribution unit, the oven comprising a metal shield incorporated therein to define a hot sector and a cold sector.

* * * * *